United States Patent [19]
Gaidis et al.

[11] Patent Number: 4,968,734
[45] Date of Patent: Nov. 6, 1990

[54] CEMENT ADMIXTURE

[75] Inventors: James M. Gaidis, Ellicott City; Joseph M. Daly, Columbia, both of Md.

[73] Assignee: W.R. Grace & Co.-Conn., N.Y.

[21] Appl. No.: 87,380

[22] Filed: Aug. 20, 1987

Related U.S. Application Data

[63] Continuation-in-part of Ser. No. 880,848, Jul. 1, 1986, abandoned.

[51] Int. Cl.$^5$ .............................................. C08K 3/00
[52] U.S. Cl. ...................................... 524/5; 526/240; 526/318.42
[58] Field of Search .............................. 524/5; 106/90; 526/318.42, 240

[56] References Cited

U.S. PATENT DOCUMENTS

| Re. 31,936 | 7/1985 | Sperry et al. |
| 3,488,215 | 6/1968 | Shepherd et al. ............... 526/318.42 |
| 4,102,843 | 7/1978 | Sperry et al. |
| 4,293,475 | 10/1981 | Sidi ............................... 526/318.42 |
| 4,435,539 | 3/1984 | Witiak ........................... 526/318.42 |
| 4,460,720 | 7/1984 | Gaidis et al. |
| 4,473,069 | 9/1984 | Bradley et al. |
| 4,522,653 | 6/1985 | Rao et al. |
| 4,524,163 | 6/1985 | Bradley et al. |
| 4,732,698 | 3/1988 | Chen ..................................... 526/240 |
| 4,743,664 | 5/1988 | Matui et al. ........................... 526/240 |

FOREIGN PATENT DOCUMENTS

| 0039617 | 11/1981 | European Pat. Off. ................ 524/5 |
| 0055035 | 6/1982 | European Pat. Off. ................ 524/5 |
| 0097513 | 1/1984 | European Pat. Off. ................ 524/5 |
| 58-074552 | 5/1983 | Japan ..................................... 524/5 |
| 58-156562 | 9/1983 | Japan . |
| 59-162158 | 9/1984 | Japan . |
| 59-162161 | 9/1984 | Japan . |
| 0268959 | 4/1970 | U.S.S.R. ................................. 524/5 |
| 2031397 | 4/1980 | United Kingdom . |

OTHER PUBLICATIONS

Superplasticizer in Concrete by Malhotra et al.

Primary Examiner—Joseph L. Schofer
Assistant Examiner—N. Sarofin
Attorney, Agent, or Firm—Howard J. Troffkin

[57] ABSTRACT

The present invention is directed to a copolymer of acrylic or methacrylic acid and a hydroxyalkyl acrylate or methacrylate, to cement admixture compositions containing said polymer and to hydraulic cement compositions containing said admixture. The copolymer is composed of from 20 to 40 mole percent of an alkali metal salt of acrylic or methacrylic acid either as the free acid or as their alkali or alkaline earth metal salt and from 60 to 80 mole percent of hydroxyalkyl acrylate or methacrylate; said polymer having a weight average molecular weight of at least 70,000.

6 Claims, No Drawings

CEMENT ADMIXTURE

The present application is a copending continuation-in-part application of U.S. application having Ser. No. 880,848 filed on July 1, 1986.

BACKGROUND OF THE INVENTION

The present invention is directed to a novel copolymer which can be utilized as a cement admixture to greatly increase the fluidity or slump characteristics of hydraulic cement compositions without causing excessive retardation or prevent set of the treated composition.

Hydraulic cement compositions are brought into a workable form by mixing the solid components with an amount of water which is greater than that required to hydrate the cement components therein. The mixed mineral binder composition is poured into a form and allowed to harden at atmospheric temperature. During the hardening, some of the excess water remains, leaving cavities in the formed structural unit and, thus, reduces the mechanical strength of the resultant unit. It is well known that the compressive strength of the resultant structure generally bears an inverse relationship to the water-cement ratio of the starting mix. The desire to use smaller quantities of water is limited by the required flow and workability properties of the fresh mixture.

It is desired in many applications to use unset cement compositions which are of low viscosity or even self-leveling and, at the same time, are capable of forming a set cement of high compressive strength (via low water-cement ratio). In structural cement compositions, for example, it is highly desirable to maintain very low water content in order to achieve high strength in the final product. On the other hand, it is desirable that the unset composition have fluid properties to enhance mixing to cause uniform distribution of the liquid (water) in the solid components, pumpability to permit the unset cement composition to be carried to the needed structural site and flowability to permit the unset cement composition to be readily shaped into the desired form.

Cement admixtures (The term "admixture" as used herein and in the appended claims is a term of art referring to compounds and compositions added to cement mixtures or compositions to alter their properties. The term does not imply that the components of an admixture do or do not interact to cause the desired result) capable of causing the above-described viscosity reducing characteristics are known. These materials are generally categorized as "water-reducing agents" if they are capable of modifying viscosity to a limited degree or as "high range water-reducing agents" or "superplasticizers" if they have the ability to permit large water cuts in the cement mixture while maintaining fluidity or cause large increases in fluidity at constant water content. Lignin sulfonates and polysaccharides are known water reducing agents while sulfite-modified condensation products of melamine-formaldehyde or sulfonate-modified condensation products of naphthalene-formaldehyde are commercially available superplasticizers. While these admixtures have the advantage of increasing initial fluidity, they also have the disadvantage of increasing the rate at which the cement composition loses its fluidity or slump. H. P. Preiss and H. R. Sasse, in Superplasticizers in Concrete, Vol. II, Ed. by V. M. Malhotra et al, pages 733–750, compare the effects of various known water-reducing agents and superplasticizers including sulfonated melamine-formaldehyde condensates, sulfonated naphthalene-formaldehyde condensates, lignin-sulfonates and polystyrene sulfonates. The study concludes that very high dosages of any of the studied admixtures are needed to appreciably increase the flow of cement compositions, yet such dosages enhance the rate of slump loss and tend to retard or prevent set.

In addition to the above mentioned known polymeric materials, various polyacrylates have been considered as cement superplasticizer admixtures. Polyacrylates of high molecular weight have been found to be unsuitable as a superplasticizer as they cause flocculation of cement slurries. More recently, certain acrylic acid-hydroxyalkyl acrylate copolymers have been suggested as a flow enhancing agent. These copolymers are required to be of low molecular weight and have a high acrylic acid content to impart water solubility to the polymeric composition and to have the copolymer exhibit stability in a cementitious environment. Although these copolymers do plasticize cement compositions, they impart excessive set retardation to the composition so that they are not suitable for general application.

It is highly desired to have superplasticizer admixture compositions which can impart a high degree of fluidity to cement compositions and can achieve this result without adverse effect of set retardation.

SUMMARY OF THE INVENTION

The present invention is directed to a novel polymeric material and to cement admixtures composed of said polymeric material. The admixture is capable of providing a high degree of fluidity to cement compositions without causing substantial set retardation.

The polymeric material is a copolymer comprising from 20 to 40 mole percent of acrylic or methacrylic acid and from 80 to 60 mole percent of a hydroxyalkyl ester of acrylic or methacrylic acid. The copolymer must be a high molecular weight product having a weight average molecular weight of at least 70,000.

DETAILED DESCRIPTION OF THE INVENTION

It has been presently found that an unexpectedly high degree of fluidity and extended work time of unset cement compositions can be achieved by having the compositions contain small dosages of the cement superplasticizer admixture of the present invention.

Cement compositions capable of being modified by the subject admixture are conventional cement-based compositions formed by mixing standardized amounts of required components, i.e. a portland cement, water, sand and aggregate, as is applicable for the particular material being formed.

The cement compositions in which the present admixture has been found useful include cement pastes, that is, mixtures composed of a portland cement and water; mortars composed of portland cement, water and sand in standard amounts; and concrete compositions composed of portland cement, water, sand, and aggregate, each in standard amounts and size. The present invention is particularly useful in concretes used to form structural units. In each of the above-described cement compositions, it is desirable to have low water to cement ratios, such as from 0.2 to 0.6, preferably from 0.3 to 0.45, in order to form a set composition of suitable strength. The amount of water present is inversely proportional to the strength of the set cement composition and, therefore, lowering the ratio is desirable.

The term 'cement composition' as used in the present disclosure and appended claims refers to pastes, mortars and concrete compositions, as described above formed with a portland or high silicate content cement. These cements are conventionally known and are manufactured by calcining a mixture of limestone and clay to form a clinker, and by grinding the clinker to a fine powder. The major compounds found in portland cement are tricalcium silicate, dicalcium silicate, tricalcium aluminate, and tetracalcium aluminoferrite.

The water to cement ratio of a particular composition will determine, to a large extent, the strength of the resultant set material. As discussed above, the amount of water required to form a uniform composition is in excess of that needed to react with the cement components. Reduction of the water to cement ratio while maintaining or increasing the fluidity of the mixture is highly desired. When using the presently described admixture, one has greater capability of forming a uniform mixture, of molding the cement composition into desired shapes, of causing the composition to be substantially self-leveling and of causing the cured cement composition to exhibit higher compressive strength than normally attainable for the same amount of cement. One further gains an extended workability time without substantially extending the set time of the resultant cement composition.

"Fluidity," "slump" and "workability" are interrelated terms. Slump is term of art relating to a standard test for determining the ease of movement of an unset cement composition. The slump test measures the amount of settlement of flow a shaped cement charge has once under unsupported conditions. A cement composition is workable, i.e. moldable, shapable, etc. while the cement exhibits some degree of slump or flow characteristics.

The subject polymer is a copolymer of (a) acrylic acid or methacrylic acid and (b) a hydroxy($C_2$-$C_3$)alkyl ester of acrylic acid or methacrylic acid and can be represented by the structural formula

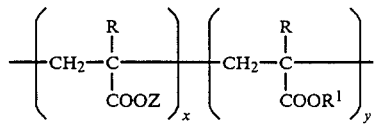

wherein each R separately represents a hydrogen or methyl group; Z represents a hydrogen atom or an alkali or alkaline earth metal or mixtures thereof; $R^1$ represents a hydroxy($C_2$-$C_3$)alkyl group as, for example, 2-hydroxyethyl, 1-methyl-2-hydroxyethyl, 2-hydroxypropyl or 3-hydroxypropyl and the like; x and y are integers such that the molar ratio of x to y is 2:8 to 4:6 and the sum of x and y represent a high molecular polymer having a weight average molecular weight of at least 70,000 and preferably from 70,000 to 400,000 and more preferably 90,000 to 400,000. The most preferred material would be substantially free of low molecular weight material, that is material having weight average molecular weights of up to about 50,000. Removal of such material can be done by conventional means such as dialysis, ultrafiltration or the like methods.

The copolymers described herein may be formed by solution polymerization utilizing conventional free radical initiators. The solvent must be a solvent for each of the monomeric reactants but need not be a solvent for the resultant copolymer. Examples of suitable solvents include cyclic ethers such as tetrahydrofuran, dioxane and the like; amides such as N,N-dimethylformamide and the like as well as other organic liquids which are capable of solvating both the monomers and the resultant polymers. Water can also be used as a polymerization medium. Other conventional polymerization techniques, such as bulk polymerization, may be used to produce the subject polymer.

The total monomer concentration should be between 10 and 40 (preferably from 25–40) weight percent based on the total weight of the initial solution. The specific concentration depends on the solubility relationship of a particular solvent, monomer and copolymer combination. The polymerization reaction can be conducted at various temperatures of from ambient to about the boiling temperature of the solutions. Lower temperatures may be used. Temperatures of from 40°–80° C. being preferred. The reaction can be run under atmospheric pressure although sub or superatmospheric pressure may be used. The most preferred polymerization conditions are the use of a 30 weight percent monomer in dioxane run at 60° C.

The polymerization is initiated using small amounts of (e.g. 0.1 to 1.5 mole percent) a conventional free radical polymerization initiator such as azobisisobutyronitrile or the like. In addition, other conventional free radical polymerization components such as chain transfer agents (butanethiol, etc) and the like can be used to control molecular weight of the polymer. The specific amounts required can be readily determined by conventional methods.

The resultant polymer solution can be treated with a material capable of precipitating the polymer from solution. This material is, preferably, also a solvent for residual monomer. Examples include non-cyclic ethers, such as diethyl ether, chlorinated hydrocarbon, such as chloroform and the like. The precipitated polymer can be taken up in aqueous solution by neutralization with an alkali or alkaline earth metal hydroxide, preferably sodium hydroxide, to form the water soluble copolymer product of the present invention.

The copolymer of the present invention is required to be a high molecular weight material having a weight average molecular weight of at least 70,000. Polymers of molecular weights of from 70,000 to 400,000 are preferred and from 90,000 to 400,000 are most preferred. It has been unexpectedly found that copolymers having a low concentration of acrylic or methacrylic acid units of from 20 to 40 mole percent and the above described molecular weight are water soluble and impart the desired properties to cement compositions.

The above described copolymer has been unexpectedly found to be a cement admixture which greatly enhances the fluidity of a cement composition in relation to the same cement composition which is void of the present admixture. The admixture is normally an aqueous solution of the alkali or alkaline earth metal salt form of the subject copolymer. The polymer can be diluted with water to the desired concentration to provide an admixture which can be readily added to the cement composition.

The amount of the present superplasticizer cement admixture required in a cement composition should be an effective amount to substantially reduce the water content (by about 10 percent or greater) while retaining equivalent slump of a blank cement composition or an effective amount to substantially increase the slump while maintaining the water to cement ratio, whichever is desired. The specific amount of the present superplasticizer cement admixture required to provide a desired slump can be readily determined and will depend upon the cement composition and the ratio of components of the composition. Generally the amount will range from about 0.01 to 2, preferably 0.1 to 0.5 weight percent of total solids of the cement composition. Greater amounts may be used but generally are unnecessary to achieve the desired results.

The superplasticizer cement admixture of the present invention can be added to cement compositions in any conventional manner. For example, the components can be added to the cement compositions substantially simultaneously such as by previously mixing the components, either in a dry state or as an aqueous solution and adding the formed composition to the cement composition. It is preferred that the present superplasticizer be introduced into a cement composition as aqueous solution either simultaneously with, as part of or subsequent to the addition of water used to form the wet cement compositions such as just prior to utilization of the cement composition. The subject superplasticizer cement admixture should be substantially uniformly mixed with the cement composition to permit interaction between the present admixture and the hydraulic cement of the cement composition as well as interaction of the admixture components (the exact nature of the interaction is unknown and not meant to be a limitation on the present invention) causing unexpected increased initial fluidity and retention of fluidity over time.

The cement composition may contain other conventional cement admixtures added in amounts and in manners known in the art. For example, the cement composition containing the superplasticizer described herein may also contain air entraining agents such as resin soaps, alkyl benzene sulfonates and the like or retarders such as gluconates, sugars and the like as well as other admixtures.

The resultant cement structure, although formed from a wet cement composition exhibiting great fluidity and extended time of fluidity, is a structure of increased strength. This is especially important and desirable when the cement structure is a structural concrete formation.

The following examples are given for illustrative purposes only and are not meant to be a limitation on the subject invention except as defined in the claims appended hereto. All parts and percentages are by weight unless otherwise indicated.

EXAMPLE I

A. Copolymerization was conducted at 28.7 weight percent total monomer concentration in dioxane. The monomer distribution was 40 mole percent acrylic acid and 60 mole percent hydroxypropyl methacrylate (97% 2-hydroxypropyl). The monomer-dioxane solution was introduced into a 3 neck round bottom flask equipped with a magnetic stirrer, thermometer, nitrogen gas inlet needle and a water-cooled condenser for nitrogen egress. The reaction vessel was purged with nitrogen gas for 30 minutes. 0.65 mole percent azoisobutyronitrile (AIBN) was then introduced and the reaction vessel was immersed into a glycerol bath maintained at 56° C. Polymerization was allowed to continue for 5.5 hours after which the reaction vessel was removed from the bath and allowed to cool. The polymer product was precipitated with diethyl ether, filtered and washed several times with fresh diethyl ether.

A sample of the unneutralized polymer was removed for titration and gel permeation chromatography analysis. The remaining polymer product was dried under vacuum at 80° C. for 12 hours and was then taken up in distilled water followed by neutralization with 5N NaOH to a thymolphthalein end point. The neutralized product was precipitated with tetrahydrofuran and then dried under vacuum at 80° C. for 24 hours.

The molecular weight of the unneutralized product was determined by gel permeation chromatography in tetrahydrofuran on a a cross linked polystyrene size exclusion column ($\mu$ Styragel of Waters Associates) using polystyrene and polyethylene glycol standards for calibration. The ratio of monomeric units was determined by gravimetric acid-base titration of the purified, free acid copolymer.

The analysis of the copolymer product was as follows:

Acrylic acid/hydroxypropyl methacrylate (mole %) 29/71

Sodium acrylate/hydroxypropyl methacrylate (wt %) 21/79

Weight average molecular weight 341,000

B. The procedure described above was repeated except that 34 mole percent acrylic acid and 66 mole percent hydroxypropyl methacrylate were added to the dioxane; 0.64 mole percent AIBN was added; and the bath reaction temperature was 86° C. An exotherm occurred raising the reaction temperature to 93° C. The polymerization was allowed to run for 13.5 hours.

The copolymer product was analyzed as follows:

Acrylic acid/hydroxypropyl methacrylate (mole %) 35/65

Sodium acrylate/hydroxypropyl methacrylate (wt %) 26/74

Weight average molecular weight 130,000

$B^1$. The procedure described above was repeated with 40 moles percent acrylic acid and 60 mole percent HPMA added to dioxane; 0.65 mole percent AIBN was added; and the bath reaction temperature was 80° C. The exotherm occurred raising the reaction temperature to 88° C. The polymerization was allowed to run for 2.5 hours.

The copolymer product was analyzed as follows:

Acrylic acid/hydroxypropyl methacrylate (mole %) 39/61

Sodium acrylate/hydroxypropyl methacrylate (wt %) 29/71

Weight average molecular weight 91,000

EXAMPLE 2

The copolymers prepared according to Example IA, IB and $IB^1$, above, were each added to cement pastes formed from Type I cement mixed with water in a water to cement ratio of 0.45. Samples were prepared in which the copolymer was added (at 0.4%-solid/total cement solid, s/s) as part of the mix water ("Regular Addition") and additional samples were prepared by first mixing the Type I cement with 95 percent of the total water and then an aqueous solution composed of the remaining water and a copolymer sample was added after a seven minute period (Delayed Addition) to each sample.

The flow properties were measured according to a minislump flow test as described by L. M. Meyer and W. F. Perenchio in Concrete International, Page 36–43 (January 1979). The measurement was done after a period of eight minutes from the first addition of water. The set time of each sample was analyzed by conventional calorimetry determination on each of the regular addition samples. The results are shown below:

| Polymer | Minislump Flow (Diameter) | | Set Time |
|---|---|---|---|
| | Regular Addition | Delayed Addition | |
| | (mm at 8 minutes) | | |
| A | 155 | 123 | 11.25 |
| B | 155 | 197 | 11.7 |
| $B^1$ | 132 | 179 | — |
| Blank | 88 | 88 | 8.0 |

The above data shows that the copolymers A, B and $B^1$ were capable of imparting a high degree of fluidity to the cement composition with both regular and delayed addition and they imparted relatively little retardation.

EXAMPLE 3

The following example is given for comparative purposes. Samples of low molecular weight copolymer rich in acrylic acid were prepared and used as a cement composition fluidizer described in U.S. Pat. No. 4,473,406 (hereafter labeled Polymer C). In addition, a similar copolymer to that described in U.S. Pat. No. 4,473,406 was prepared except it was a high molecular weight material (hereafter labeled Polymer D). A polymer was prepared for this comparison having the acrylic acid/hydroxypropylmethacrylate (AS/HPMA) ratio substantially the same as Sample IA except it was of low molecular weight (hereafter Polymer E). Finally, a polymer was prepared for comparative purposes having a AA/HPMA ration of 35/65 which was substantially the same as Sample 1-B and 1-$B^1$ except for its molecular weight (hereinafter Polymer F). Each of htese materials was found to be inferior to the copolymer of the present invention.

The copolyumerization of each of the copolymers were conducted in the same manner as the preparations of Example IA described above. The specific conditions are given hereinbelow.

| Polymer | Monomer Feed mole % | AA/HPMA Product Free Acid mole % | Product Na Salt wt. % | $C_4H_9SH$ mole % | AIBN mole % | Temp °C. | Time hrs | $\overline{Mw}$ |
|---|---|---|---|---|---|---|---|---|
| C | 69/31 | 69/31 | 59/41 | 5.0 | 0.60 | 61 | 17.0 | 4,000 |
| D | 79/21 | 78/22 | 70/30 | 0 | 0.53 | 60 | 3.0 | 238,000 |
| E | 40/60 | 28/72 | 20/80 | 5.1 | 0.65 | 59 | 5.5 | 7,700 |
| F | 34/66 | 35/65 | 26/74 | 0.9 | 0.57 | 60 | 15.0 | 38,400 |

Each of the copolymer products were used as a fluidizer in a cement composition in the same manner as described in Example 2 above. The results are given in the Table below and directly compared with the results shown in Example 2.

| Polymer | Minislump Flow | | Set Time (hrs) |
|---|---|---|---|
| | Regular Addition | Delayed Addition | |
| | mm at 8 minutes | | |
| A | 155 | 123 | 11.25 |
| B | 152 | 197 | 11.7 |
| $B^1$ | 132 | 179 | — |
| C | 102 | 146 | 19.0 |
| D | 40 | 192 | 15.75 |
| E | 104 | 111 | 11.0 |
| F | 92 | 129 | 12.0 |

| | Minislump Flow | | |
|---|---|---|---|
| | Regular Addition | Delayed Addition | Set Time |
| Polymer | mm at 8 minutes | | (hrs) |
| Blank | 88 | 88 | 8.0 |

It is clearly shown that the copolymers of the present invention (A,B and B[1]) are unexpectedly capable of imparting a high degree of fluidity to cement compositions while maintaining reasonable set times. In contrast samples C & D exhibits a high degree of retardation. In addition, the high molecular weight sample D exhibits stiffening due to flocculation (shown by low flow value). Examples E and F, although showing little retardation, exhibits a very low degree of fluidification in both regular and delayed addition performance.

What is claimed:

1. In a structural concrete composition formed from a silicate based cement, sand, aggregate and water and having a superplasticizer therein, the improvement comprising that said plasticizer is a water soluble copolymer having a weight average molecular weight of at least 70,000 which is composed of from 20 to 40 mole percent of an ethylenically unsaturated acid selected from acrylic acid, methacrylic acid or the alkali or alkaline earth metal salt thereof and from 60 to 80 mole percent of a hydroxy $C_2$–$C_3$ alkyl ester of an ethylenically unsaturated acid; selected from methacrylic acid and methacrylic acid, and said superplasticizer is present in said cement composition in from 0.01 to 2 percent solid superplasticizer based on the total solids of the cement composition; wherein the unset composition exhibits a high degree of initial fluidity without causing substantial set retardation.

2. The concrete composition of claim 1 wherein said superplasticizer is a copolymer composed of an ethylenically unsaturated acid selected from acrylic acid, methacrylic acid or an alkali or alkaline earth metal salt thereof and said hydroxyl ester is selected from a hydroxypropyl acrylate or hydroxypropyl methacrylate; said copolymer having a weight average molecular weight of from 70,000 to 400,000.

3. The concrete composition of claim 1 wherein said superplasticizer is a copolymer composed of an ethylenically unsaturated acid selected from acrylic acid, methacrylic acid or an alkali or alkaline earth metal salt thereof and said hydroxyl ester is selected from a hydroxethyl acrylate or hydroxypropyl methacrylate; said copolymer having a weight average molecular weight of from 70,000 to 400,000.

4. The concrete composition of claim 1 wherein said superplasticizer is a copolymer composition substantially absent polymeric material having a weight average molecular weight of less than 50,000.

5. The concrete composition of claim 2 wherein the acid is acrylic acid and the ester is a hydroxypropyl group.

6. The concrete composition of claim 2 wherein the polymer is a copolymer of acrylic acid and hydroxypropylmethacrylate.

* * * * *